United States Patent
Rana et al.

(10) Patent No.: US 9,919,293 B1
(45) Date of Patent: Mar. 20, 2018

(54) CATALYST FOR MILD-HYDROCRACKING OF RESIDUAL OIL

(71) Applicant: KUWAIT INSTITUTE FOR SCIENTIFIC RESEARCH, Safat (KW)

(72) Inventors: Mohan Singh Rana, Safat (KW); Meena Marafi, Safat (KW); Faisal S. Alhumaidan, Safat (KW); Khalidah Al Dalama, Safat (KW)

(73) Assignee: KUWAIT INSTITUTE FOR SCIENTIFIC RESEARCH, Safat (KW)

(*) Notice: Subject to any disclaimer, the term of this patent is extended or adjusted under 35 U.S.C. 154(b) by 0 days.

(21) Appl. No.: 15/652,088

(22) Filed: Jul. 17, 2017

(51) Int. Cl.
| | | |
|---|---|---|
| *B01J 23/883* | (2006.01) |
| *B01J 23/888* | (2006.01) |
| *B01J 21/04* | (2006.01) |
| *B01J 21/12* | (2006.01) |
| *B01J 29/08* | (2006.01) |
| *B01J 37/00* | (2006.01) |
| *B01J 37/08* | (2006.01) |
| *B01J 37/02* | (2006.01) |

(52) U.S. Cl.
CPC ............ *B01J 23/883* (2013.01); *B01J 21/04* (2013.01); *B01J 21/12* (2013.01); *B01J 23/888* (2013.01); *B01J 23/8885* (2013.01); *B01J 29/084* (2013.01); *B01J 37/0009* (2013.01); *B01J 37/0201* (2013.01); *B01J 37/08* (2013.01)

(58) Field of Classification Search
CPC ...... B01J 23/883; B01J 37/0201; B01J 37/08; B01J 37/0009; B01J 29/084; B01J 21/04; B01J 23/888; B01J 23/8885; B01J 21/12
See application file for complete search history.

(56) References Cited

U.S. PATENT DOCUMENTS

| | | | |
|---|---|---|---|
| 2,926,130 A | 2/1960 | Hogan | |
| 3,853,742 A * | 12/1974 | Ward | B01J 20/18 208/111.15 |
| 3,891,541 A * | 6/1975 | Oleck | B01J 23/85 208/216 PP |
| 3,931,052 A * | 1/1976 | Oleck | B01J 23/85 502/307 |
| 4,097,365 A | 6/1978 | Ward | |
| 4,419,271 A | 12/1983 | Ward | |
| 4,447,555 A | 5/1984 | Parrott et al. | |
| 4,499,202 A | 2/1985 | Arias et al. | |

(Continued)

FOREIGN PATENT DOCUMENTS

CN 104069895 A 10/2014

*Primary Examiner* — Anthony J Zimmer
(74) *Attorney, Agent, or Firm* — Richard C. Litman

(57) ABSTRACT

The catalyst for mild-hydrocracking of residual oil includes a porous alumina support a plurality of transition metals impregnated on the alumina support. The support has a specific surface area greater than 150 $m^2/g$, a total pore volume ranging from about 0.25 ml/g to about 1.5 ml/g, about 20% of the pores having a diameter greater than 150 nm, about 70% of the pores having a diameter ranging from about 2 nm to about 150 nm, and about 10% of the pores having a diameter less than 2 nm. The plurality of transition metals include one Group VIII element and one or more Group VI elements.

11 Claims, 16 Drawing Sheets

(56) References Cited

U.S. PATENT DOCUMENTS

| | | | |
|---|---|---|---|
| 4,587,012 A * | 5/1986 | Quann | B01J 21/04 208/216 PP |
| 4,672,048 A | 6/1987 | Ward et al. | |
| 4,738,767 A | 4/1988 | Ward | |
| 4,738,944 A * | 4/1988 | Robinson | B01J 23/28 208/216 PP |
| 4,780,446 A * | 10/1988 | Nozemack | B01J 21/12 502/234 |
| 4,846,961 A * | 7/1989 | Robinson | B01J 23/28 208/112 |
| 5,290,429 A * | 3/1994 | Delaney | B01J 23/883 208/145 |
| 5,389,595 A * | 2/1995 | Simpson | B01J 23/85 502/211 |
| 5,453,411 A | 9/1995 | Dai et al. | |
| 5,506,182 A * | 4/1996 | Yamagishi | B01J 29/061 502/64 |
| 5,531,885 A * | 7/1996 | Mizutani | B01J 23/883 208/209 |
| 5,906,731 A * | 5/1999 | Abdo | B01J 23/85 208/108 |
| 5,954,944 A * | 9/1999 | Zhang | B01J 23/888 208/111.01 |
| 6,508,999 B1 * | 1/2003 | Carruthers | B01J 21/04 423/629 |
| 6,551,500 B1 | 4/2003 | Ishida et al. | |
| 6,733,657 B2 | 5/2004 | Benazzi et al. | |
| 6,872,685 B2 | 3/2005 | Timken et al. | |
| 6,995,112 B2 * | 2/2006 | Timken | B01J 21/12 502/240 |
| 7,323,100 B2 | 1/2008 | Espinoza et al. | |
| 9,199,228 B2 * | 12/2015 | Domokos | B01J 29/084 |
| 9,719,034 B2 * | 8/2017 | Shih | C10G 69/02 |
| 2007/0125684 A1 | 6/2007 | Biesmans et al. | |
| 2009/0098032 A1 * | 4/2009 | Yang | B01D 53/945 423/213.2 |
| 2011/0100875 A1 * | 5/2011 | Singh | B01J 21/12 208/111.3 |
| 2011/0118107 A1 * | 5/2011 | Garcia-Martinez | B01J 29/04 502/62 |
| 2012/0055846 A1 | 3/2012 | Domokos et al. | |
| 2013/0081977 A1 | 4/2013 | Woo et al. | |
| 2014/0034549 A1 | 2/2014 | Ujal et al. | |
| 2014/0151266 A1 | 6/2014 | Zhan et al. | |
| 2015/0031929 A1 * | 1/2015 | Asoaka | C10L 1/04 585/733 |
| 2015/0175911 A1 * | 6/2015 | Shih | C10G 69/02 208/64 |
| 2015/0306581 A1 * | 10/2015 | Zhang | B01J 29/08 208/111.3 |
| 2015/0306582 A1 * | 10/2015 | Zhang | B01J 29/084 208/111.3 |
| 2015/0306583 A1 * | 10/2015 | Zhang | B01J 29/166 208/111.3 |
| 2016/0001265 A1 * | 1/2016 | Willis | B01J 21/04 585/653 |

* cited by examiner

CATALYST FOR MILD-HYDROCRACKING OF RESIDUAL OIL

BACKGROUND OF THE INVENTION

1. Field of the Invention

The present invention relates to hydroprocessing catalysts for residue hydrotreatment, and particularly to a catalyst for mild-hydrocracking of residual oil to enhance middle distillate yield.

2. Description of the Related Art

Petroleum refining has evolved continuously in response to the change in consumer demand for better and different products. In Kuwait, three refineries and several hydrotreating units are in operation for purifying naphtha, kerosene, diesel and atmospheric residue (AR) streams. Due to the huge demand for fuel oil, nearly 250,000 barrels of atmospheric residues are upgraded and converted to high quality products using catalytic hydroprocessing. In the petroleum refining industries, the final products are not always obtained through simple processing. Some of the processes are primarily aimed at 'purification' of the products or feed streams to bring down the sulfur and nitrogen levels or to improve product stability, color or smell. The most important catalytic processes in the petroleum refineries include fluidized catalytic cracking (FCC), hydrocracking, catalytic reforming and hydrotreating. The FCC or residue fluid catalytic cracking (RFCC) process produces very low quality distillate. In addition the RFCC requires high quality feedstock (low metals, <20 ppm), which is very difficult to acquire in the current crude oil scenario. Thus, one of the most promising alternatives is hydroprocessing.

Hydroprocessing provides a selective yield of products, and produces high-quality (low sulfur, nitrogen) products. However, the catalyst design for such desirable products is not simple, as the catalyst has to meet the performance level of refinery streams along with the stability against the time-on-stream (TOS). Generally, hydrocracking is a two-stage process which combines catalytic cracking and hydrogenation—where heavier feedstocks are cracked in the presence of hydrogen to produce more desirable products. The process employs high pressure, high temperature, catalysts, and hydrogen. The hydrocracking process largely depends on the nature of the feedstock and the relative rates of two competing reactions, hydrogenation and cracking. Hence, a balance between these two reactions is compulsory. The catalytic sites, which are normally responsible for hydrogenation, can also contribute to the hydrogenolysis (C—S, C—N, C—O etc. bond breaking), where sulfur and nitrogen compounds present in the feedstock are converted to hydrogen sulfide and ammonia. The acidity of conventional catalysts is typically generated by using chlorine or fluorine over the alumina (halogenated alumina) support, while the recent trend is to use amorphous or crystalline (zeolite) silica-alumina as support, which generates strong acid sites. These strong acidic sites normally result in a rapid catalyst deactivation, which significantly impacts the feasibility of the process. Hydrocracking requires very high $H_2$ pressure (10 to 20 MPa) which can be somewhat compensated with a slight increase in temperature, without changing the liquid yield (diesel), a process known as mild hydrocracking (MHCR).

Thus, a catalyst for mild-hydrocracking of residual oil to enhance middle distillate yield solving the aforementioned problems is desired.

SUMMARY OF THE INVENTION

The catalyst for mild-hydrocracking of residual oil includes a porous alumina support and a plurality of transition metals impregnated on the alumina support. The support has a specific surface area greater than 150 $m^2/g$, a total pore volume ranging from about 0.25 ml/g to about 1.5 ml/g, about 20% of the pores having a diameter greater than 150 nm, about 70% of the pores having a diameter ranging from about 2 nm to about 150 nm, and about 10% of the pores having a diameter less than 2 nm. The plurality of transition metals include one Group VIII element and one or more Group VI elements.

The catalyst can be used for mild-hydrocracking of residual oil under industrial conditions for mild-hydrocracking, including for example, temperatures ranging from about 380° C. to about 400° C., a pressure of about 12 Mpa, space velocity (LHSV) at 1 h−1 and with H/HC ratio of 680. The catalyst can simultaneously remove sulfur, nitrogen, and metals under such mild-hydrocracking conditions. The catalyst can provide mild-hydrocracking activity for about 200 hours with time-on-stream. The catalyst demonstrates selective cracking capacity of about 20% to about 25% for middle distillate and about 30% for naphtha. The catalyst has low selectivity for gas formation.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
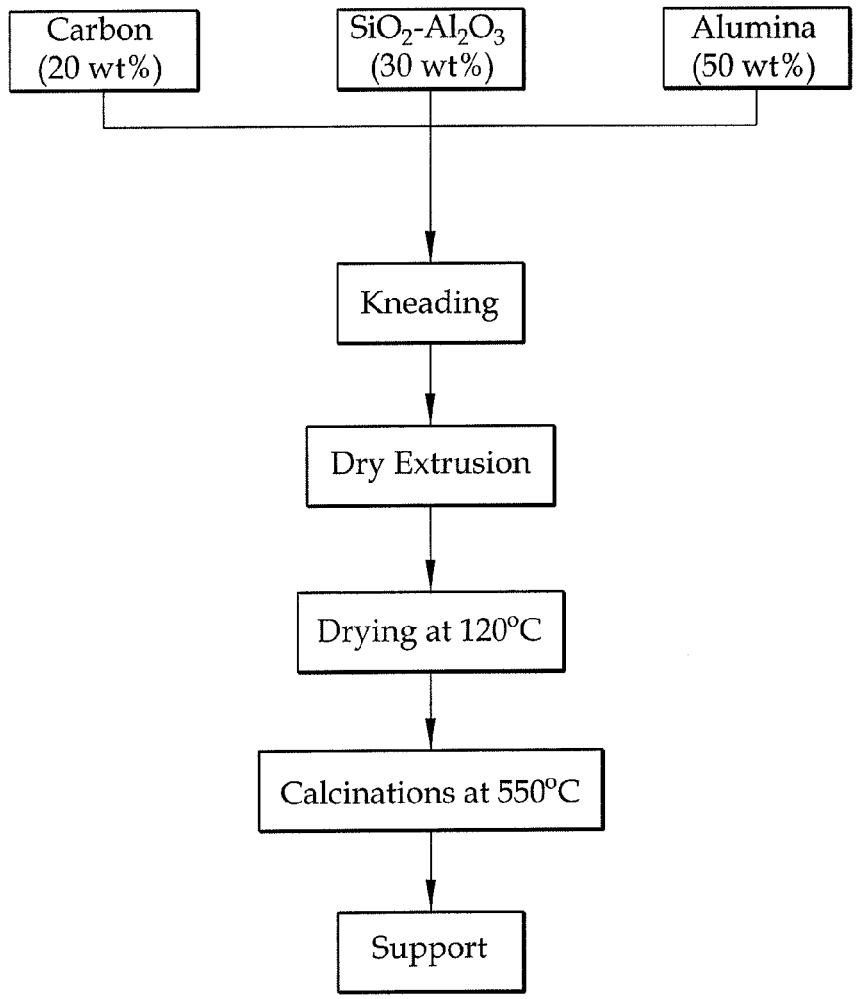
FIG. 1 is a flow diagram showing catalyst support synthesis.

A catalyst for mild-hydrocracking includes at least one hydrogenation component supported on a porous refractory alumina support. The hydrogenation component can include at least one catalytically active metal from Group VIB and one promoter metal from Group VIII ("promoter"). For example, the hydrogenation component can be bi-metallic (NiMo or NiW) or tri-metallic (NiMoW, CoMoW). The active and promoter metals can be in a sulfide phase, e.g., $MoS_2$, $WS_2$. The support can be in an oxide phase, e.g., alumina-oxide. The support can include silica and alumina. The alumina-silica can be amorphous or crystalline. For example, the support can include from about 0 wt % to about 30 wt % amorphous silica. The support can include magnesium and/or carbon. The catalyst can have acid site distribution and well dispersed active metals from Group VIB of the periodic table along with promoter metals from Group VIII of the periodic table. The catalyst can be a mild hydrocracking (MHCR) catalyst. The catalyst can enhance middle distillate selectivity for atmospheric residue, e.g., for hydrocracking Kuwait Export crude atmospheric residue (KEC-AR).

The catalyst can achieve a high level of desulfurization, remove heteroatom impurities, and improve selective product. The present inventors have used the catalyst for residue hydrotreatment to enhance catalytic hydrocracking activity using slightly higher temperatures, e.g., temperatures ranging from about 177° C. to about 400° C. or from about 380° C. to about 400° C., in order to enhance selectivity for middle distillate yield. The catalyst or mild hydrocracking (MHCR) catalyst achieves adequate textural and acidic properties, as well as hydrogenation functions. The catalyst can include an appropriate proportion of active and promoter metals.

Hydrocracking and/or mild hydro-cracking is sensitive to the acidic function, which increases complex hydrocarbon conversion into smaller hydrocarbons. However, if a strong acid sites catalyst is used, secondary cracking reaction can predominate, resulting neither in selective yield of liquid product nor catalyst stability. On the other hand, if a mild or low hydrogenation function catalyst is used, excess olefin can polymerize and deactivate catalytic sites as well as reduce pore diameter, resulting in poor selectivity for product and shortened catalyst life. The present inventors have found that a catalyst with weak acid sites and strong hydrogenation functions will be able to keep the required amount of conversion (low conversion), which can be enhanced with increasing temperature particularly in the range of 380° C. to 400° C. Hence, a balance between acid sites and hydrogenation functions can be the most important parameters that govern activity and selectivity of the catalysts.

An appropriate catalyst formulation for heavy crudes and residues requires a balance between textural properties, chemical composition, and active metal dispersion. A residue feed or feedstock can have low API gravity (low flow), considerable amount of asphaltene (largest, most complex or unstable compound in petroleum) and metals (Ni & V). With respect to impurities in the feed, processing complications can be associated with carbon, metals deposition on the catalyst and sediment formation (product instability). Another issue for consideration is process conditions, which dictates catalyst selection based on the acidity and hydrogenation along with the textural properties. Asphaltene, micro carbon Residue (MCR) or conradson carbon residue in the feedstock composition are the heaviest and most complex molecular species that are usually found in residues and needs to be converted or cracked into smaller fractions or molecules. Usually, asphaltenes are composed of polycyclic aromatic hydrocarbons, which contains significant amounts of heteroatoms (S and N) and metals (Ni and V). During processing, asphaltene and metals are deposited on the catalytic sites, and as a result, decrease catalytic activity. Such catalyst deactivation represents a great deal of challenge in heavy oil and residue processing.

As shown in Table 1, the present inventors prepared a plurality of catalyst supports (Supports A-G) using dry extrusion of alumina (Support A), physical mixing of amorphous silica-alumina 30 weight percentage (Supports B and C), physical mixing of different ratios of alumina and Y-zeolite (CBV 720) (15-62 wt %) (Supports D1-D4), physical mixing of alumina and Y-zeolite (30 wt %) and carbon (20 wt %) (Support G), and physical mixing of alumina and Siral 40HPV (30 wt %) (Support E).

TABLE 1

Raw material used for support preparation and its composition

| Support | | Alumina | Other component |
|---|---|---|---|
| A | | $Al_2O_3$, 100 wt % | — |
| B | | $Al_2O_3$, 70 wt % | 30 wt % Siral 30 |
| C | | Siral 30 commercial Extrudates (trilobe) ($Al_2O_3$—$SiO_2$) (70:30 wt %) | |
| D | D1 | $Al_2O_3$, 85 wt % | 15 wt % Zeolite (CVB 720) |
| | D2 | $Al_2O_3$, 70 wt % | 30 wt % Zeolite (CVB 720) |
| | D3 | $Al_2O_3$, 50 wt % | 50 wt % Zeolite (CVB 720) |
| | D4 | $Al_2O_3$, 38 wt % | 62 wt % Zeolite (CVB 720) |
| E | | $Al_2O_3$, 70 wt % | Siral 30 HPV |
| F | | $Al_2O_3$, 70 wt % | 30 wt % Mg – Zeolites (CVB 720) |
| G | | $Al_2O_3$, 50 wt % | 30 wt % zeolite + 20 wt % carbon |

The support components can be milled and kneaded with a peptizing agent, such as $HNO_3$. For example, an aqueous solution of about 2-4 vol % $HNO_3$ acid solution can be used to peptize boehmite and prepare a paste (semi-wet). The components can be kneaded to form a wet elastic material, and subsequently extruded in a defined shape and diameter. Water can be added to the afore-mentioned raw material to facilitate milling and molding in an extruder to provide a cylindrical configuration, with an average outer diameter of about 2.5 mm and an average length of about 6-8 mm. The solid extrudates can be maintained at room temperature, dried at 120° C., and then calcined at about 550° C. for about 4 hours, using a heating ramp rate of about 2.5-3° C./min in the presence of air. An exemplary support preparation flow sheet is shown in FIG. 1. The alumina can also work as a binder after acid peptization and during the mixing of the support components. Hence, the catalyst support can be a composite of alumina, silica-alumina and/or Y zeolite material.

The final pore size distribution of the composite support material can be tailored to a specific catalytic application and composition of feedstock. For example, a residue HDM and asphaltene conversion would require a larger pore diameter (>20 nm), high pore volume, while smaller pores (>5 nm) would provide larger surface area necessary to achieve a high metal dispersion or higher sulfur removal and hydrogenation rates. A bi-modal type of pore structure can be beneficial to enhance catalyst stability.

Once the desired acidic and textural properties are achieved in the support, the supported catalysts can be prepared by the incipient wetness impregnation method, using various combinations of active metals and promoters. Mild hydrocracking (MHCR) catalysts are known for their high hydrogenation function in order to compensate increased temperature. Therefore, the selection of the active phase and the dispersion of active sites on the support are crucial for this balanced activity. A critical component of the catalysts are active metals and their even distribution (high dispersion) on the surface of the support. The cracking catalyst includes one or more active metals over the acidic support that is mainly responsible for the hydroconversion of residue. A suitable amount of metals can be used to prepare the catalyst using an impregnation method such as incipient wetness co-impregnation or pore volume impregnation. Hence, a stable aqueous solution of active metals (Mo and W) and promoters (Ni or Co) salts can be prepared together in de-ionized water and impregnated as co-impregnation solution. The impregnating solutions can vary with respect to active metals and promoters, e.g., Co+Mo, Ni+Mo, Ni+Mo+W, or Ni+W. After impregnation, the impregnated support can be dried in air, at ambient temperature, and submitted to calcination under an oxidizing atmosphere, preferably in air. Metal salt impregnated catalysts can be dried at 120° C. for 12 hours. The dried catalysts can be calcined under nitrogen atmosphere at 450° C. for 4 h. The final composition of the catalysts are shown in Table 2.

TABLE 2

Catalyst composition and their combinations

| Support | Sample ID Metals | Metal, wt % | | |
|---|---|---|---|---|
| | | Mo | W | Ni (Co) |
| A | HDM-1 (NiMo) | 11.1 | — | 2.5 |
| ($Al_2O_3$) | HDM-3 (NiW) | — | 19.1 | 4.3 |
| | HDM-4 (NiMoW) | 7.3 | 3.8 | 2.3 |
| B | HDM-2 (NiMo) | 10.5 | — | 2.2 |
| ($SiO_2$—$Al_2O_3$) | HDM-5 (NiMoW) | 7.3 | 3.2 | 2.7 |
| C | HDM-9 (NiMoW) | 7.1 | 3.0 | 2.1 |
| (Siral 30) | HDM-10 (CoMoW) | 7.2 | 2.97 | (1.89) |
| | HDM-7 (NiMo) | 10.1 | — | 2.1 |
| | HDM-8 (NiW) | — | 18.7 | 4.1 |
| D | HDM-14 (NiM)o | 11.1 | — | 2.2 |
| $Al_2O_3$ – Zeo | HDM-11 (NiMo) | 10.8 | — | 2.4 |
| | HDM-15 (NiMo) | 10.7 | — | 2.3 |
| | HDM-16 (NiMo) | 10.2 | — | 2.1 |

TABLE 2-continued

Catalyst composition and their combinations

| Support | Sample ID Metals | Metal, wt % | | |
|---|---|---|---|---|
| | | Mo | W | Ni (Co) |
| E (Si40HPV + Al) | HDM-12 (NiMo) | 11.4 | — | 2.2 |
| F (Mg – Zeo + Al) | HDM-13 (NiMo) | 10.4 | — | 2.1 |
| G (Zeo + C + Al) | HDM-17 (NiMo) | 11.1 | — | 2.4 |

The exemplary mild hydrocracking catalysts shown in Table 2 were evaluated for their catalytic activities using a multiple micro-reactor fixed-bed unit that emulates the hydrotreating reactions in commercial hydroprocessing units. The operating conditions in the evaluation tests were as follows: LHSV=1.0 hr−1, $H_2$/Oil=680, temperature=380-400° C. and pressure=120 bar. The activity and the stability of all catalysts were assessed by using Kuwait Export Crude oil atmospheric residue (KEC-AR) as feedstock. The physico-chemical properties of the KEC-AR are shown in Table 3.

TABLE 3

Properties of Kuwait Export Crude Atmospheric Residue (KEC-AR) used as feedstocks

| Property | Composition |
|---|---|
| Sulfur, wt % | 4.96 |
| Vanadium, ppm wt. | 59.8 |
| Nickel, ppm wt | 20 |
| Total metals (Ni + V) | 79.8 |
| Asphaltenes, wt % | 6.72 |
| Conradson Carbon Residue, wt % | 13.19 |
| Viscosity at 40° C., CSt | 977.9 |
| Viscosity at 100° C., CSt | 68.7 |
| Density @ 15° C., g/cc | 0.9791 |
| Density @ 65° C., g/cc | 0.9475 |
| Trace analysis (SEM-EDX) | |
| Si, ppm | 8.2 |
| Ca, ppm | 15.7 |
| Fe, ppm | 24.0 |

The following examples illustrate the present teachings.

EXAMPLES

Figure 2:
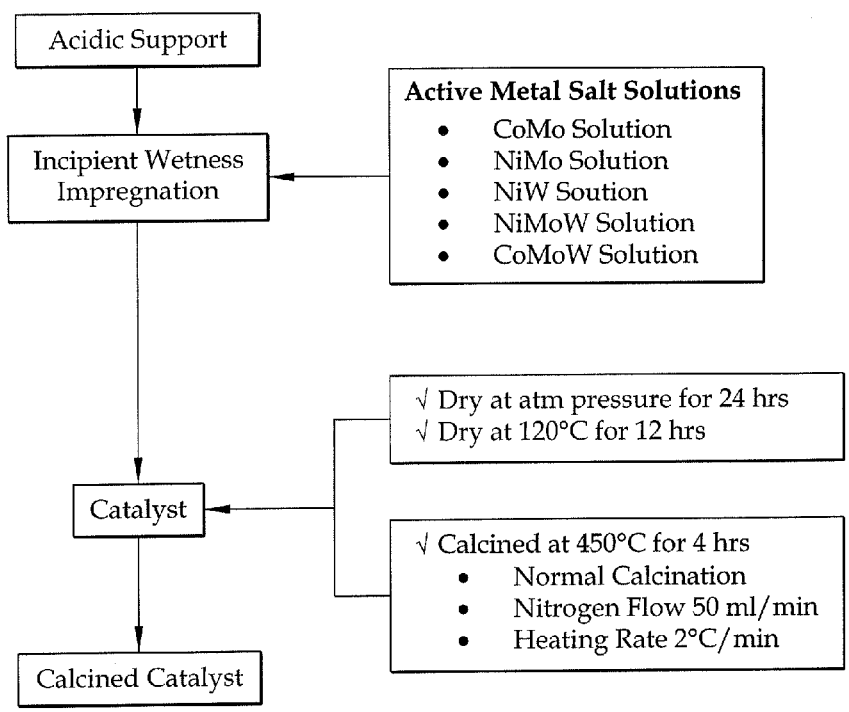
FIG. 2 is a flow diagram showing catalyst preparation.
Figure 3:
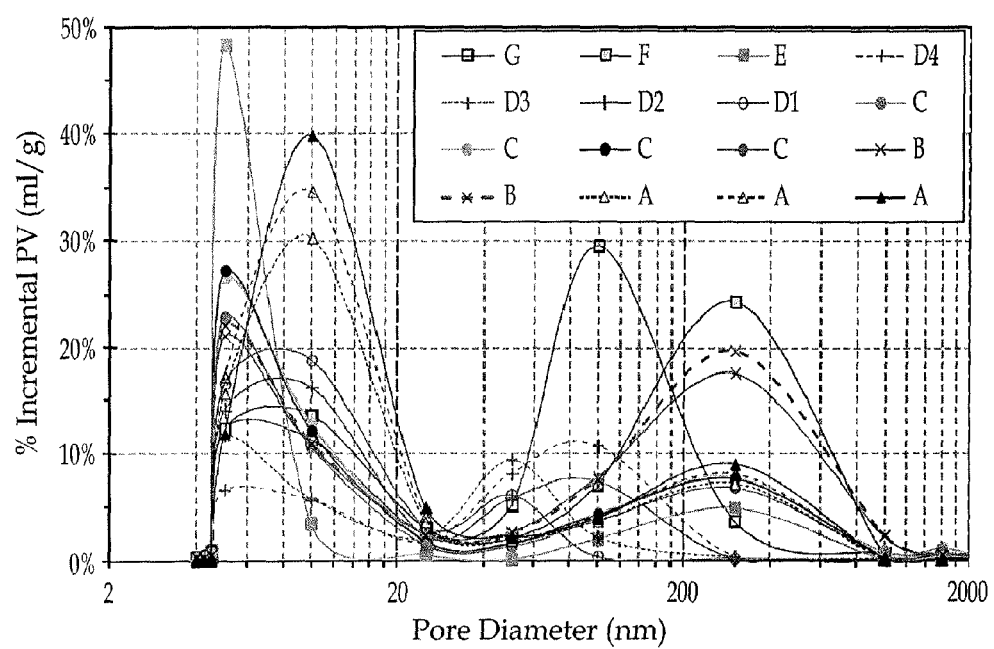
FIG. 3 is a graph showing pore volume and pore size distribution.
Figure 4:
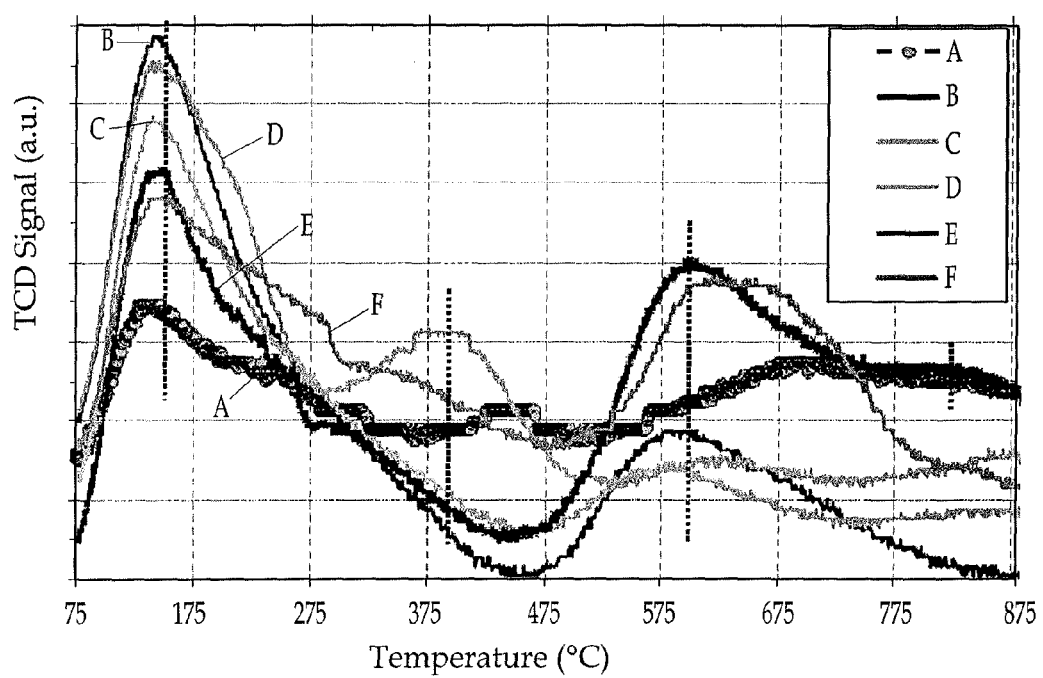
FIG. 4 is a graph showing NH3-TPD spectra of the exemplary catalyst supports.

Sixteen catalysts (MHCR-1 to MHCR-17) were prepared and evaluated with KEC-AR. Exemplary supports included alumina, silica-alumina, and/or zeolite, and the catalyst composition included active metals impregnated thereon. Examples 1-2 illustrate different methods of preparation of the acidic composite (support) (FIG. 1) and catalyst preparations (active metal impregnation) (FIG. 2), respectively. Example 3 provides a characterization for a support (acidic and textural properties) (FIG. 3 and FIG. 4). Examples 4-8 describe catalytic activities for the exemplary catalysts (FIGS. 5-9D).

Example 1: (Support Preparation and Compositions)

Catalysts having a support composition including pseudo-boehmite (Versal), alumina, as amorphous silica-alumina and/or crystalline Y-zeolite, were prepared. The raw material Versal alumina (pseoboehmite), zeolite-Y ($SiO_2$/$Al_2O_3$ ratio 30) and Siral are commercially available registered trademarks of UOP, Zeolyst International and Sasol, respectively.

Alumina powder was ground alone (support A) or mixed and ground with other support components (supports B-G). For example, silica and alumina were combined to provide support B, Y-zeolite was combined with alumina to provide support D, Magnesium and Y-zeolite were combined with alumina to provide support F, Carbon and Y-zeolite were combined with alumina to provide support G, and Siral 40HP was combined with alumina to provide support E. The components were physically mixed in a ball-mill. The alumina or alumina in combination with other component powders, were kneaded with a peptizing agent, such as $HNO_3$. For example, an aqueous solution of 2-4 vol % $HNO_3$ acid solution was used to peptize boehmite and prepare a paste (semi-wet). The components were kneaded to form a wet elastic material, which was subsequently extruded in a defined shape and diameter. Water was added to the afore-mentioned raw material to facilitate milling and molding in an extruder to provide a cylindrical configuration, with an average outer diameter of about 2.5 mm and an average length of about 6-8 mm. The solid extrudates were maintained at room temperature for 24 hours, and then dried at 120° C. for 12 hours. Finally, support extrudates were calcined at 550° C. for 4 hours, using a heating ramp rate of 2.5-3° C./min in the presence of air. An exemplary support preparation flow sheet is shown in FIG. 1 for support G.

Specifically, the various exemplary supports (A, B, C, D, E, F, and G) were prepared using dry extrusion of alumina (Support A), physical mixing of alumina with Siral 30 [amorphous $SiO_2$—$Al_2O_3$ (30 wt % $SiO_2$)] (Support B), physical mixing of alumina with commercial Siral tri-lobe extrudates (Support C), physical mixing of alumina with different ratios (15, 30, 50, 62 wt %) of Y-zeolite (CBV 720) (Support D), physical mixing of alumina with Mg—Y-zeolite (30 wt %) (Support F), physical mixing of alumina with Y-zeolite (30 wt %) and carbon (20 wt %) (Support G), or physical mixing of alumina with Siral 40HPV (30 wt %) (Support E), as provided in Table 1. The prototype support extrudates were prepared, dried and finally calcined at 550° C. for 4 h, to provide the acidic catalyst support. The alumina can work as a binder after acid peptization and during the mixing of alumina into the pore enlarging agent and carbon, which were mixed and converted into support extrudates. In order to further vary the acidic function, an amount of zeolite content was varied to provide multiple D type supports, with different concentration of zeolite (Si/Al ratio 30) such as 15, 30, 50 and 62 wt % of Y-zeolite in alumina. In order to slightly decrease the number of strong acid sites, support F was prepared with Mg-exchanged Y zeolite (Mg-zeolite) and support F was prepared with carbon, a neutral component. Support E was prepared with large pore silica (Siral 40 HPV), which has low acid sites, and high pore diameter.

Example 2: (Catalyst Preparation and Composition)

Once the desired acidic and textural properties were achieved in the support, supported catalysts were prepared. The supported catalysts described herein can be used for residue (KEC-AR) conversion where the selective cracking apparent rate is high and the reaction is at least partially diffusion limited. The composite support material is calcined, dried and desiccated, and placed in contact with an aqueous solution (based on support water retention capacity) which includes one or more active metals. The specific choice of active metals, promoters, and their composition depends upon the desired hydrogenation function and the required balance with the support acidity. The most preferred hydrogenation compounds include oxides and/or sulfides of Mo, W, Ni and mixtures of two or more of these compounds as shown in FIG. 2. The catalysts were prepared using incipient wetness impregnation method, e.g., using catalytically active metals such as Mo and W, and promoters such as Ni and Co. The metal precursors used in the impregnation process were ammonium heptamolybdate $[(NH_4)_6Mo_7O_{24}\cdot 4H_2O]$, ammonium metatungstate hydrate $[(NH_4)_6H_2W_{12}O_{40x}H_2O]$, nickel(II) nitrate $[Ni(NO_3)_2\cdot 6H_2O]$, cobalt(II) nitrate $[Co(NO_3)_2\cdot 6H_2O]$. Subsequently the impregnated supports were maintained at atmospheric pressure and room temperature for 24 hours, dried at 120° C. for 12 hours, and calcined at 450° C. for four hours using normal calcination, 50 ml/min nitrogen flow, and a heating rate of 2° C./min. to provide the final supported catalysts in an oxidized form. Hence, the final catalysts included transition metals selected from Group VIB metals, Group VIII metals, and combinations thereof. Table 2 above shows the final catalyst composition for the various exemplary supported catalysts.

Example 3: Catalysts Characterization (Tailored to a Specific Operation)

The influences of both textural properties and $NH_3$-TPD acidity strength on the finished support were examined. Support compositions were prepared in the form of extrudates. The residue hydroprocessing catalyst was expected to perform a number of catalytic reactions such as removal of asphaltene, metals (Ni and V), HDS, HDN along with cracking of large molecule to smaller sizes. Thus, catalysts were prepared with pores of varying diameters. The bi-modal type of pore structure is beneficial to enhance pore diffusion limitations and stability of the catalyst. Hence, the catalyst has added advantages because the large pores provide pathways for rapid molecular transportation and the small pores provide a large, active surface, contributing to high diffusion efficiency and high dispersion of supported metal simultaneously. Particularly, asphaltene and metal provide the necessary activity for the larger pores while the smaller pores provide the surface area necessary to achieve a high dispersion of metals as a result of high hydrogenation (HYD) and hydrogenolysis. The bi-modal type of pores is further described in FIG. 3, where Hg-porosimetery results indicate the distinctive pore diameter along with their pore size distribution and pore volume distribution. Table 4 shows catalyst support, composition and the associated physical properties for each catalyst, analyzed by Hg porosimetry. The heavier the feed, the larger the pore modes would need to be, i.e., greater than 25 nm as shown in Table 4.

TABLE 4

| Support | Catalyst composition | SSA, m²/g | PV, cc/g | APD, nm | Range pore, nm 1st mode | 2nd mode |
|---|---|---|---|---|---|---|
| A | NiMo/A | 174.7 | 0.749 | 17.1 | 12-17 | 515 |
| | NiW/A | 169.6 | 0.652 | 15.4 | 11-16 | 410 |
| | NiMoW/A | 190.6 | 0.739 | 15.5 | 10-14 | 392 |
| B | NiMo/B | 163.2 | 0.696 | 17.0 | 7.9-43 | 810 |
| | NiMoW/B | 172.1 | 0.736 | 17.1 | 7.8-52 | 665 |
| C | NiMoW/C | 206.9 | 0.633 | 12.2 | 7.8-11 | 515 |
| | CoMoW/C | 209.7 | 0.635 | 12.1 | 7.7-11 | 490 |
| | NiMo/C | 202.5 | 0.623 | 12.3 | 8.2-11 | 515 |
| | NiW/C | 170.0 | 0.530 | 12.5 | 7.8-11 | 510 |
| D | NiMo/D15 | 150.0 | 0.480 | 12.8 | 9.5-12 | 119 |
| | NiMo/D30 | 136.7 | 0.489 | 14.3 | 9.4-14 | 114 |
| | NiMo/D50 | 96.8 | 0.347 | 14.3 | 7.6-18 | 92 |
| | NiMo/D62 | 70.4 | 0.369 | 21.4 | 8.6-92 | 114 |
| E | NiMo/E | 268.3 | 0.574 | 8.6 | 7.9-8.1 | 515 |
| F | NiMo/F | 124.4 | 0.698 | 22.4 | 8-18.7 | 518 |
| G | NiMo/G | 114.9 | 0.72 | 25.1 | 9-129 | 220 |

As described previously, the present catalysts have a bimodal type pore structure, with about 5-20% of the total pore volume in pores greater than 25 nm (i.e., macro-pores). The bi-modal pore volume distribution and incremental pore volume is plotted as a function of pore diameter, where the resulting function exhibits two maxima (10 nm and 400 nm). These two modes are characterized in that the primary mode (meso-pores) exhibits a higher maximum (85%) than the secondary (15%) mode macro-pores.

Catalyst performance further relates to cracking function and number of acid sites, which are inherent properties of the support and vary with its composition. The exemplary supports (A-G) were characterized by ammonia adsorption and desorption using temperature programmed desorption ($NH_3$-TPD) for acidity measurements. After the adsorption of $NH_3$ (saturation for 15 min with $NH_3$ and He gas) at 75° C., the TPD was conducted in a constant flow of He from 75 to 900° C. at a heating rate of 10° C./min.

FIG. 4 shows various types of acid sites and their variation with temperature indicating the specific acid strength carried out by the particular support. Hence desorption peak area represents the amount of acid sites and the peak temperature represents the acid strength. The existence of three distinctive ranges indicates that it has weak, medium and strong acid sites. In FIG. 4, the peak associated with temperatures lower than 125° C. was related to weak acid sites and the peak associated with temperatures higher than 575° C. related to strong acid sites. It could be seen that support E has considerably high acidity in this region.

Hence, textural properties such as pore size distribution, average pore diameter, and total pore volume of the catalysts significantly impact catalyst stability. Catalysts with bimodal nature of pores, in particular, have a significant impact on various type of catalytic activities. Smaller pores (5-12 nm) contribute to the HDS while large pores particularly >100 nm allow diffusion of large molecule of micro-carbon residue (MCR), asphaltene, metals along with sulfur, where reactions simultaneously occur in the reactor.

Example 4: Mild Hydrocracking to Enhance Lighter Fraction

The different exemplary supported catalysts for catalytic activities were tested using Kuwait Export Crude Atmospheric Residue (KEC-AR) as feedstock. The feedstock had metals, sulfur, and asphaltene contents. The feedstock physico-chemical properties are provided in Table 3 above. Activity results for various catalysts are compared based on the textural properties, acidity and hydrogenation functions.

Figure 5:
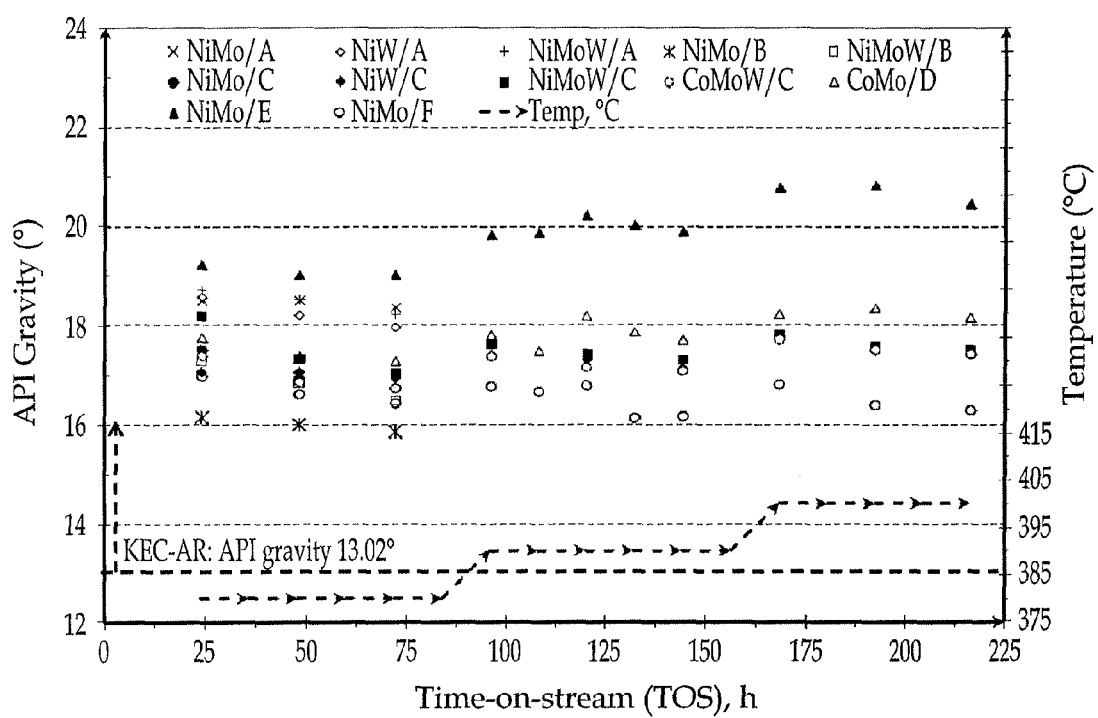
FIG. 5 is a graph showing performance of the exemplary supported catalysts for KEC-AR conversion as API gravity increases with time-on-stream.

The hydrocracking of the KEC-AR into lighter fractions mainly varies the density of the residue. The density was subsequently used to calculate API gravity of the hydrotreated product. "API gravity," determined by ASTM D4052-11, refers to the gravity of a petroleum feedstock or product relative to water. An enhancement in API gravity using hydroprocessing is mainly associated with the production of lighter molecular weight and with higher content of hydrogen. The API increase is associated with a combination of relatively low hydrogen pressure (12 MPa), slightly higher operating temperature (380-400° C.), which enhance cracking with the help of the catalyst, HDS, HDM, HDN, and hydrodeasphaltenization (HDAs). Due to hydrogenation, the process is also favorable to more stable product formation (low sludge and sediment). Catalysts used for this embodiment comprise various composition of supports (A-F), with variation in hydrogenation of active metals such as NiMo, NiW and NiMoW. An API increase is a function of catalyst that is mainly due to the textural properties of the support. The API increase in the supports were as follows: E>A≈D≈C where catalyst NiMo/E has maximum pore diameter in the range of 6-12 nm, and catalyst NiMo/A has broader range of pores in 6-40 nm diameter that are relatively higher than the other catalyst. A comparison of KEC-AR conversion as API gravity increases with time-on-stream for the various catalysts is shown in FIG. 5, indicating role of textural properties as well as active metal composition.

Figure 6:
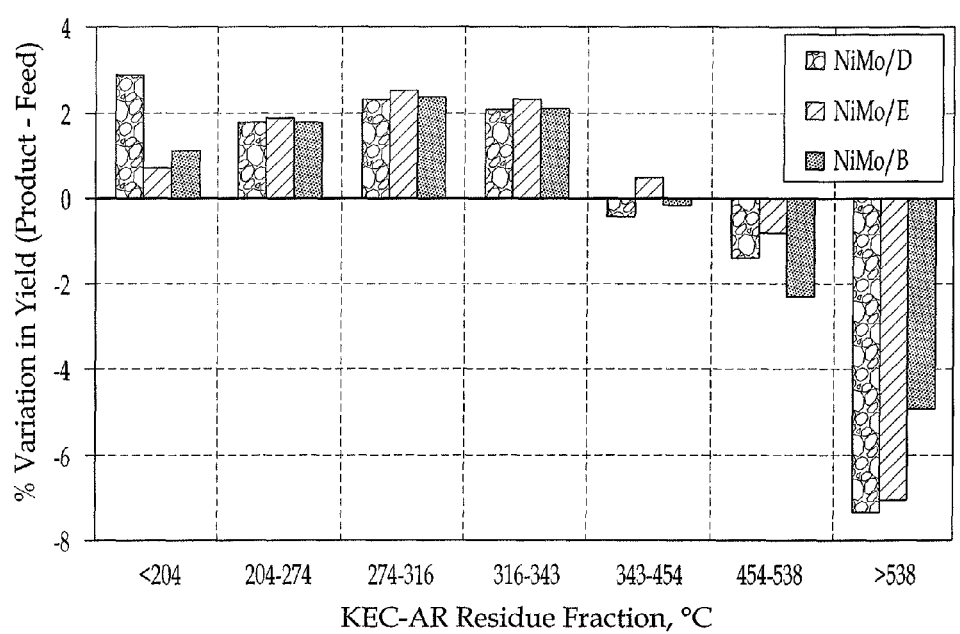
FIG. 6 is a graph showing the difference in product yield for various NiMo supported catalysts at 200 hours TOS.

FIG. 6 shows the difference between the feed and product in order to specify fractional variation for each catalyst. The negative bars indicate the conversion while positive bars represent the products obtained with the variation of KEC-AR (feed). The volume increase is mainly due to an increase in smaller fraction and addition of hydrogen. The API gravity depends upon a combination of cracking as well as hydrogenation function of the catalysts. The hydrocracking results in smaller fraction of asphaltenes and/or micro-residue, an increased API gravity of hydrotreated residue 5° to 7° greater, and a reduced amount of metal, nitrogen and sulfur content. The selective liquid yield is to produce lighter fraction with valuable products of middle distillate range (204° C. to 345° C.) using hydroprocessing. FIG. 6 shows the difference in product yield for various NiMo supported catalysts at 200 h TOS. The selective yield of products can be seen in FIG. 6 for selected catalysts where NiMo/D catalyst has higher conversion of heavier fraction but more yield of less than 204° C. boiling point (gas). The zeolite supported catalysts have distinctive, high strength acid sites. Catalysts E and B have lower conversion for amorphous NiMo/B ($SiO_2$—$Al_2O_3$ support) but are more selective to the middle distillate.

Example 5: (Hydrodeasphaltenization)

Figure 7A:
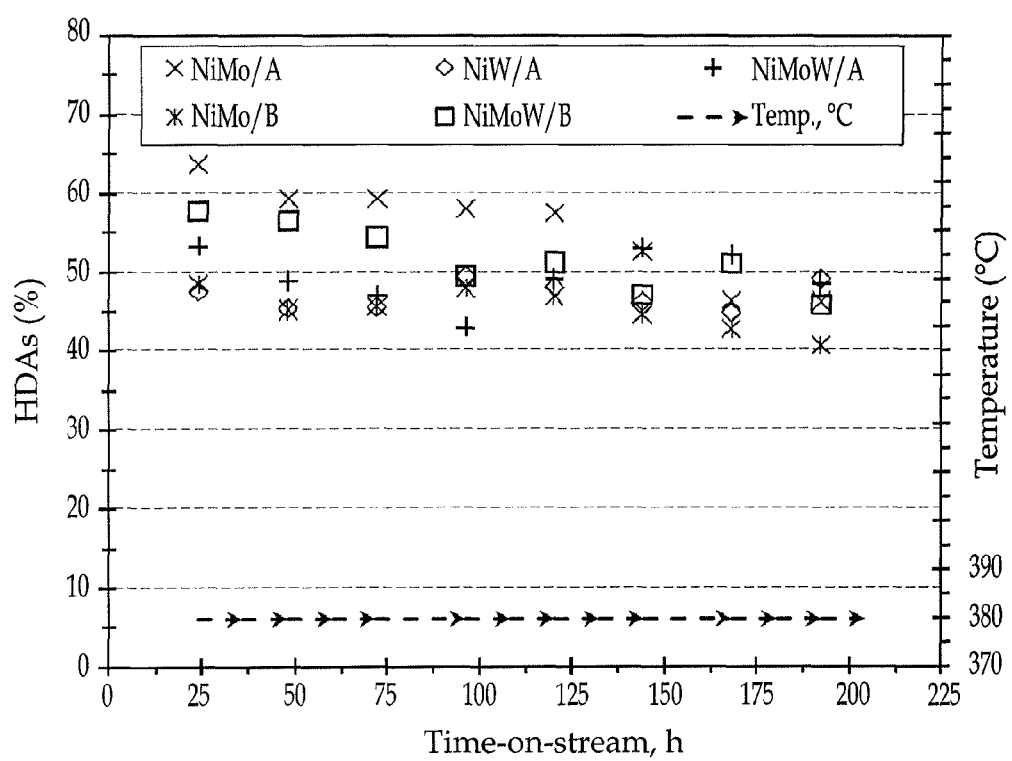
FIG. 7A is a graph showing KEC-AR hydrodeasphaltenization activity variation as a function of support and active metal composition at different reaction temperatures for the exemplary catalysts.
Figure 7B:
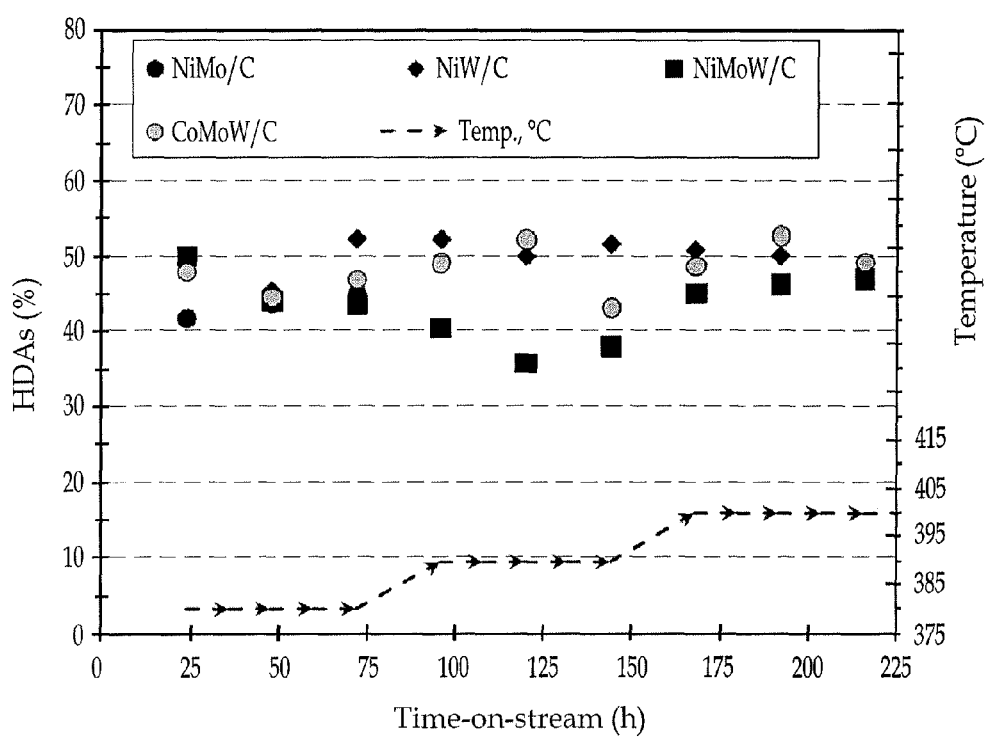
FIG. 7B is a graph showing KEC-AR hydrodeasphaltenization activity variation as a function of support and active metal composition at different reaction temperatures for the exemplary catalysts.
Figure 7C:
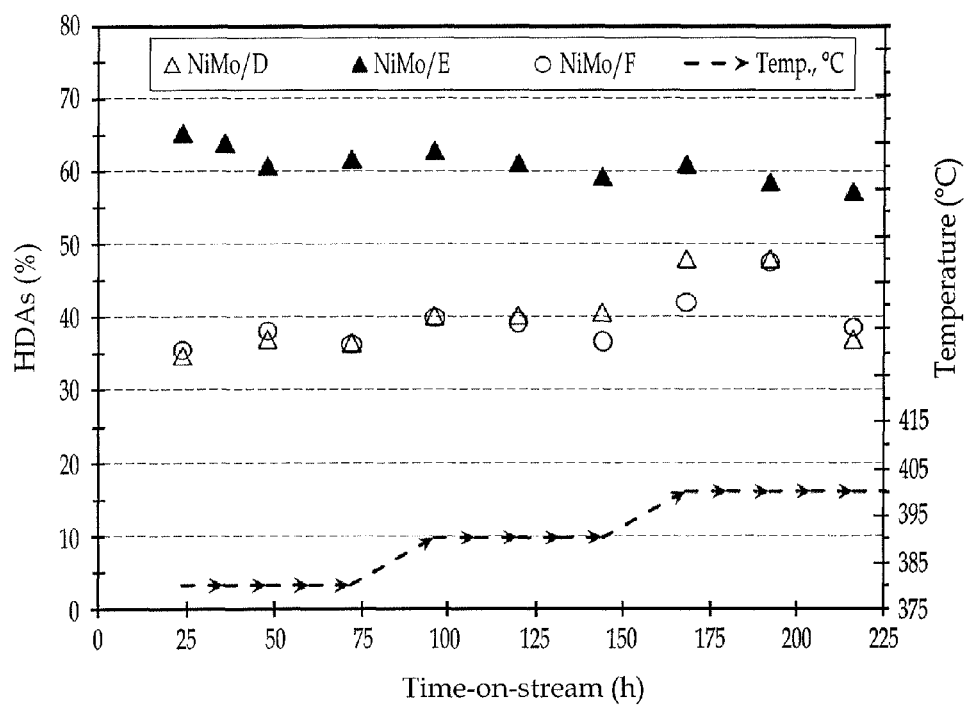
FIG. 7C is a graph showing KEC-AR hydrodeasphaltenization activity variation as a function of support and active metal composition at different reaction temperatures for the exemplary catalysts.

Various types of supports were prepared with a major component of alumina as reported in Example 1. The catalyst support type "A" has only alumina and it has only one type of pore. It is expected that type A supported catalyst has stronger hydrogenation function mainly due to the stronger metal-support interaction that showed higher and more stable activity compared to other catalysts as shown in FIG. 7A. Usually silica containing support has a tendency to lower metal support interaction. The effect of hydrogenation function also can be seen in tri-metallic composition of catalyst B that has stable and relatively higher conversion mainly due to the high hydrogenation function carried out by tri-metallic catalysts. FIG. 7B shows that the Siral 30 (supported catalysts) showed similar asphaltene conversion than the catalyst prepared with type A and B, which has stronger acid sites. The type C supported catalyst has a limited number of high strength acidic sites and relatively lower pore diameter. However, large pore and stronger acid strength catalyst E (Siral 40 HPV support) has reasonably higher conversion of asphaltene as shown in FIG. 7C. In the case of zeolite based supported catalysts (D and F), asphaltene conversion is lower which appears to be an effect of smaller pore diameter and the relatively stronger acid sites, which may deactivate faster with in the 24 hrs of TOS. However, effect of temperature showed that zeolite based catalysts do not have advantage compared to amorphous silica source supported catalysts.

High molecular weight hydrocarbons, such as asphaltenes, are typically not suitable to enter into the smaller pores like zeolite (0.7 to 1.2 nm). Therefore, limited surface catalytic sites are available for asphaltene conversion, and reaction of asphaltene molecules remain more based on temperature variation. In addition, temperature cracking processes typically are effective at breaking down large asphaltene molecules and often result in coke formation. The physical characterization and activity results indicate that the smaller the pore diameter, the shorter the life of the catalyst. Results indicated that catalyst stability is proportional to the total pore volume and mean radius of the pores.

Example 6: (Hydrodemicrocarbon Residue, HDMCR)

Figure 8A:
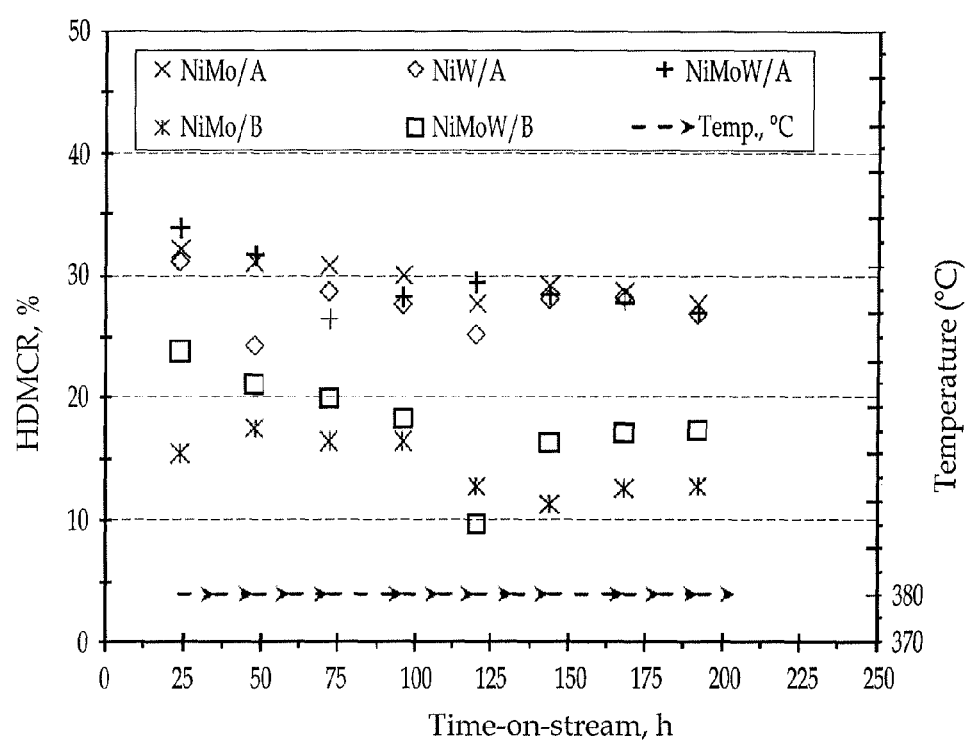
FIG. 8A is a graph showing KEC-AR hydrodemicro residue (HDMCR) activity variation as a function of support and active metal composition at different hydrocracking reaction temperatures.

The reduction in micro carbon residue (MCR) from atmospheric residue is the key parameter in order to develop effective MHCR catalyst that reduce average boiling point of the residue. The terms conradson carbon residue (CCR) or MCR are considered as coke precursor and are typically measured by using ASTM Method D-4530. Since MCR conversion depends on the acidic function of catalyst, its conversion decreases catalyst stability with TOS. FIG. 8A shows that catalyst textural properties are associated with significant differences between A type and B type supported catalyst, in which MCR conversion is mainly controlled by textual properties, as type B has higher acid sites than type A catalysts. On the other hand, active metals selection has a very limited effect on hydrogenation function. The results further indicate that the role of support preparation is crucial because textual properties are intrinsic to support. Catalyst E has superior MCR conversion that correspond to the relatively higher number of acid sites and more strength FIGS. 8B-8C.

Figure 8B:
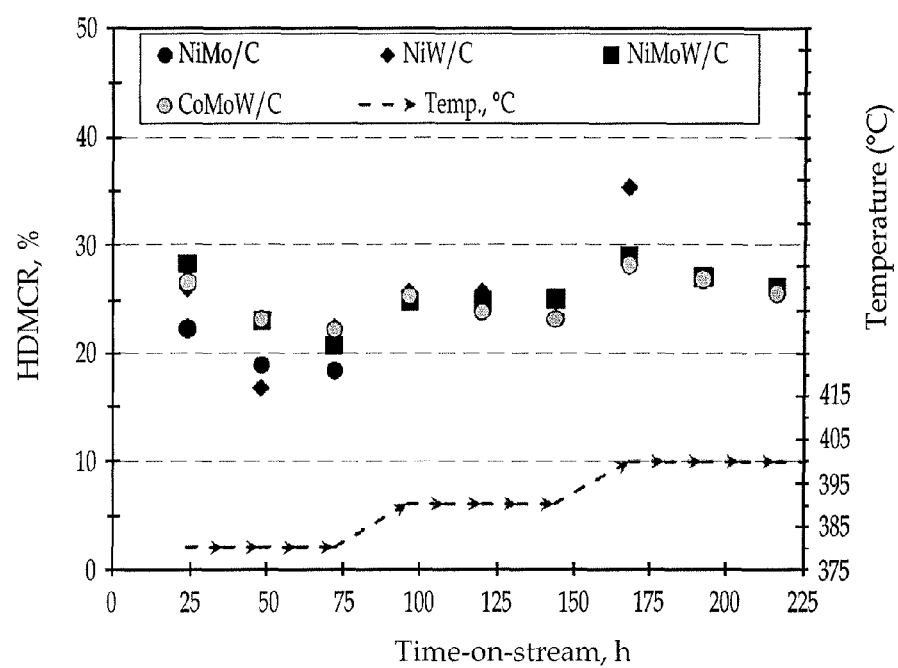
FIG. 8B is a graph showing KEC-AR hydrodemicro residue (HDMCR) activity variation as a function of support and active metal composition at different hydrocracking reaction temperatures.
Figure 8C:
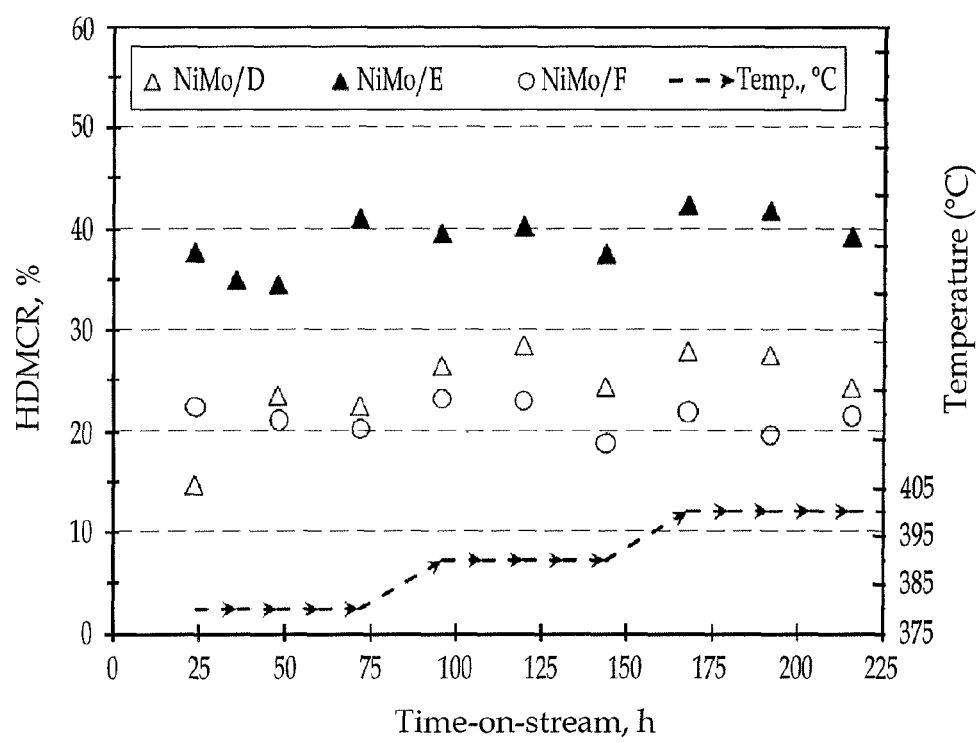
FIG. 8C is a graph showing KEC-AR hydromicro residue (HDMCR) activity variation as a function of support and active metal composition at different hydrocracking reaction temperatures.

The results also illustrate that conversion of micro residue is selectively temperature-controlled. In FIG. 8B, there are no significant roles played by active metals or the hydrogenation function carried out by the same support with variation of active metals. Hence, the conversion was not due to the catalytic sites rather it was controlled by the textural properties and the number of acid sites. The impact of textural properties such as pore size distribution, average pore diameter, and total pore volume on the stability can also be observed in the catalyst which showed almost similar properties except NiMo/E, which has significant difference in pore size distribution particularly >10 nm pores (almost two times higher).

Example 7 (Hydrodesulfurization, HDS)

A comparison of catalysts with supports A, B, C, D, E, F and G with variation in hydrogenation active metals such as NiMo, NiW and NiMoW, which correspond to catalyst NiMo/A, NiW/A and NiMoW/A, respectively. The active metals are on the surface of the support, and the structure is in sulfide phase such as $MoS_2$, $WS_2$ and Co or Ni sulfides. The hydrodesulfurization (HDS) activity for these catalysts are shown in FIGS. 9A-9D. The comparison between these catalysts clearly illustrates the impact of active metal composition where catalytic sites are mainly generated by Mo or W and endorsed by the metal promoters.

Figure 9A:
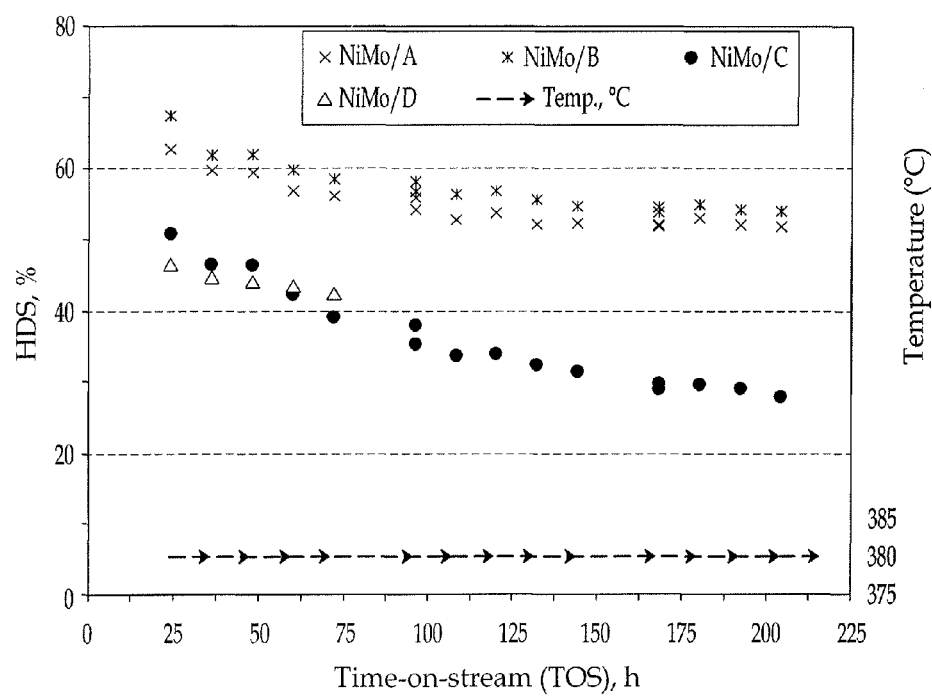
FIG. 9A is a graph showing Kuwait Export Crude atmospheric residue (KEC-AR) hydrodesulfurization activity variation as a function of support (Supports A-D).
Figure 9B:
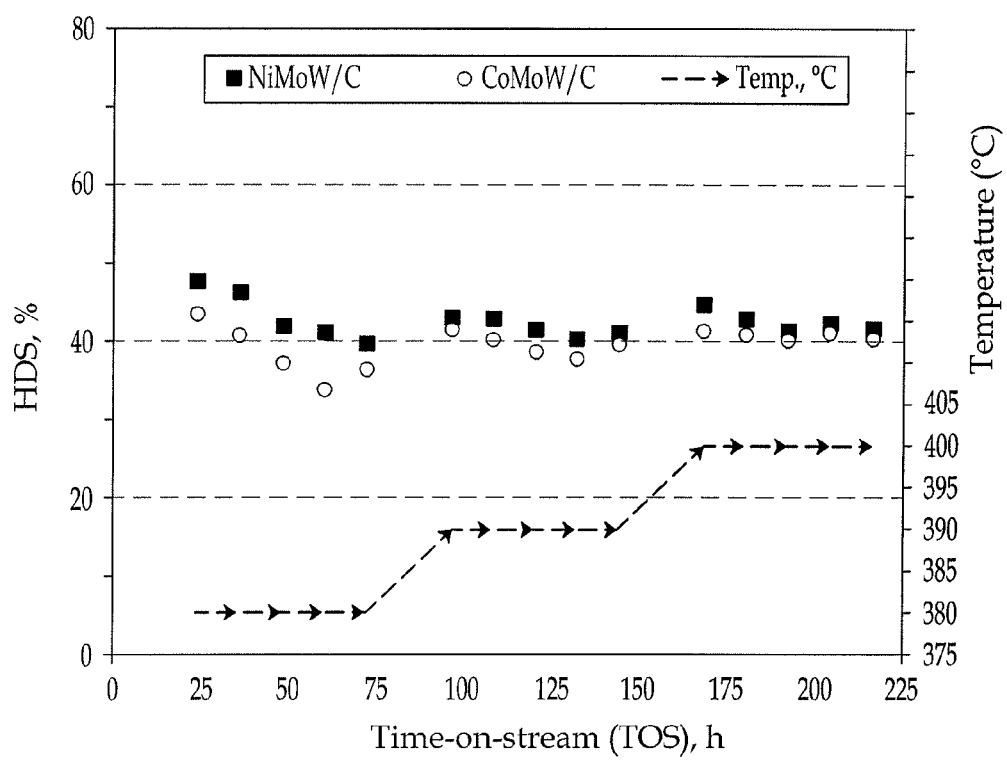
FIG. 9B is a graph showing Kuwait Export Crude atmospheric residue (KEC-AR) hydrodesulfurization activity variation as a function of active metal composition variation in Support C.
Figure 9C:
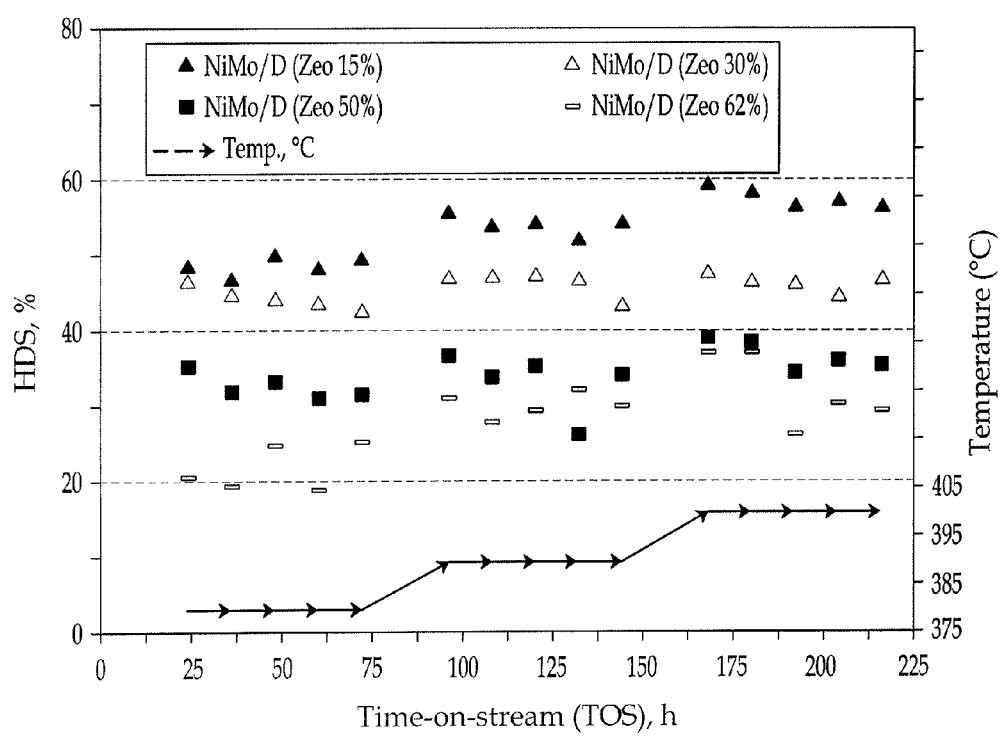
FIG. 9C is a graph showing Kuwait Export Crude atmospheric residue (KEC-AR) hydrodesulfurization activity variation as a function of support composition.
Figure 9D:
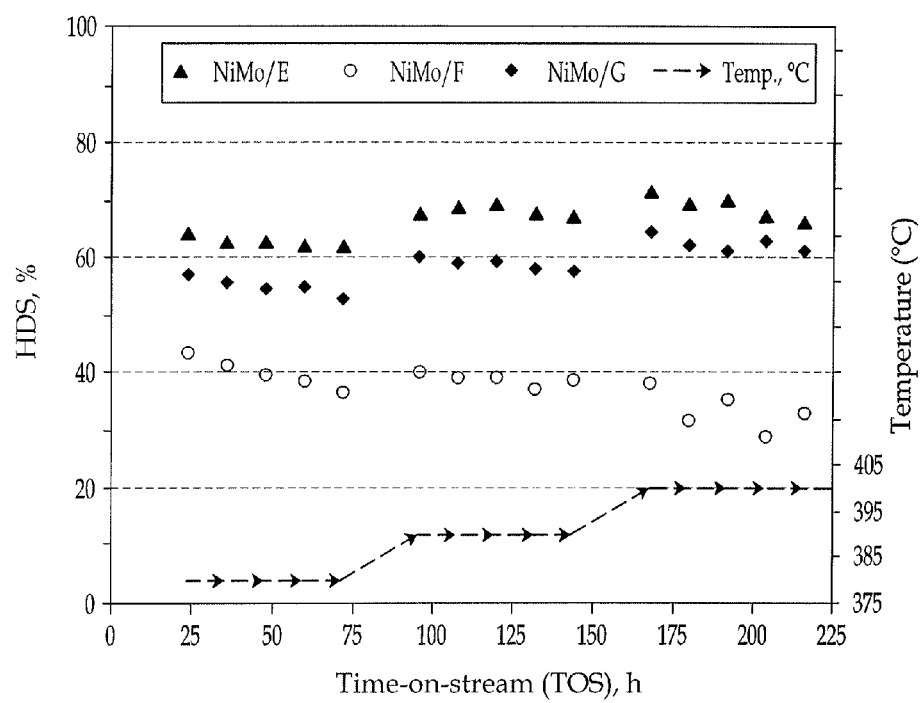
FIG. 9D is a graph showing Kuwait Export Crude atmospheric residue (KEC-AR) hydrodesulfurization activity variation as a function of support at different reaction temperatures.

FIG. 9A is a graph comparing four supports where the active phase comprises NiMo. The higher HDS performance for type A and B supported catalysts were due to the alumina content, better dispersion of active metals along with large amount of large pores, particularly pores greater than 100 nm. These supports also had a higher number of weak acid sites, which appears to be important to promote hydrogenolysis in the form of HDS. FIG. 9B is a graph comparing tri-metallic supports used in hydrotreating where small difference was observed mainly due to the better hydrogenation function carried out by NiMoW compared to CoMoW, where Ni has better hydrogenation properties than Co. The hydrogenation function is to compensate by the mild hydrocracking (MHCR) conditions that have slightly higher temperature and moderate $H_2$ pressure. In this case, the role of active metals to enhance hydrogenation becomes important because higher temperature (catalyst average temperature) will lead to increased catalyst deactivation and, as a result, shortened catalyst life. HDS active sites are considered decisive for hydrogenolysis reaction. FIG. 9C shows various amounts of zeolite in the support has significant effect on the HDS, which decreases with increasing zeolite in the supported catalyst. The supported catalysts have bimodal type of pores, with a diameter and frequency that decrease with increased zeolite content. The D type catalysts showed moderate HDS activity and moderate response to the increase in reaction temperature. On the other hand, acidity of supported catalyst increased with increased zeolite content, which appears to be important due to the diffusion of large residue molecule into the pores. Thus, the reaction is at the surface of the catalyst. FIG. 9D shows that NiMo/E catalyst has a considerably large number pores in the range of 10 nm. Mg reduces acidic sites and improves stability of the catalyst. Similarly, another catalyst (G), was evaluated, which has considerably lower HDS activity. The G type catalyst contains 20 wt % carbon, 30 wt % zeolite and rest 50% alumina, which contains considerably higher amount of large pores (greater than 50 nm) diameter, compared to the E type. Hence HDS activity difference indicated that pore diameter, acidity, the number of catalytic sites, and their distribution are a crucial parameter for hydrodesulfurization.

The good stabilities in these catalysts are attributed to their favorable textural properties, which control the diffusion of complex hydrocarbon molecules and increase the metal retention capacity. The impact of textural properties on the stability can also be observed on NiMo/A, which has shown moderate deactivation of pores and carbon deposition, mainly due to the level of impurities in feedstock. The support textural properties and the selection of support play an important role in enhancing the stability and obtained optimum catalytic activity. The large pore matrix of support material is more resistive to coke and metal depositions with time-on-stream (TOS), which can be exemplified as a primary step towards the development of residue hydroprocessing catalysts.

The HDS activities of the six selected catalysts (FIGS. 9A-9D) show that the best HDS activity that can be credited to the higher contribution of smaller pores in the range of 5-15 nm, which results in relatively smaller pores usually needed for HDS reaction. The lower conversion confirms that HDS activity is closely associated with HDAsph and HDMCR, because all of them correspond with the conversion of complex hydrocarbon molecules. In fact, HDAsph (FIGS. 7A-7C) and HDMCR (FIGS. 8A-8C) activities are closely associated and their selectivity data almost fall onto the 45-degree angle line. In addition, during the catalytic reaction, complex hydrocarbon (asphaltene) molecules converts into maltene (resin, aromatic, and saturate) and these lighter fractions can be further hydrogenated to generate a product of higher API gravity at about 5-7 degrees, which has a good economic feasibility for the direct upgrading of crude oils.

It is to be understood that the present invention is not limited to the embodiments described above, but encompasses any and all embodiments within the scope of the following claims.

We claim:

1. A catalyst for mild-hydrocracking of residual oil, comprising:
   a porous alumina-containing support having a specific surface area greater than 150 m²/g, a total pore volume ranging from about 0.25 ml/g to about 1.5 ml/g, wherein about 20% of the total pore volume of the alumina-containing support having a diameter greater than 150 nm, about 70% of the total pore volume of the alumina-containing support having a diameter ranging from about 2 nm to about 150 nm, and about 10% of the total pore volume of the alumina-containing support having a diameter less than 2 nm; and
   a plurality of transition metals impregnated on the alumina-containing support, the transition metals including one Group VIII element and one or more Group VI elements.

2. The catalyst for mild-hydrocracking of residual oil according to claim 1, wherein the Group VIII element is nickel or cobalt and the Group VI element includes at least one of tungsten and molybdenum.

3. The catalyst for mild-hydrocracking of residual oil according to claim 1, wherein the alumina-containing support further comprises a mixture with silica.

4. The catalyst for mild-hydrocracking of residual oil according to claim 1, wherein the alumina-containing support further comprises a mixture with zeolite.

5. The catalyst for mild-hydrocracking of residual oil according to claim 4, wherein the alumina-containing support further comprises a mixture with magnesium.

6. The catalyst for mild-hydrocracking of residual oil according to claim 4, wherein the alumina-containing support further comprises a mixture with carbon.

7. A process for preparing the catalyst for mild-hydrocracking of residual oil according to claim 1, comprising:
   providing catalyst support components in powder form, the catalyst support components including alumina;
   kneading the support components using a peptizing agent to form a paste;
   extruding the paste to provide a solid extrudate;
   drying the solid extrudate at a temperature of about 120° C. for about 12 hours;
   calcining the dried extrudate at a temperature of about 550° C. for about 4 hours to provide a catalyst support;
   impregnating the catalyst support with one Group VIII element and one or more Group VI elements using incipient wetness impregnation to provide the catalyst for mild-hydrocracking of residual oil.

8. The process for preparing a catalyst for mild-hydrocracking of residual oil according to claim 7, wherein the Group VIII element is nickel or cobalt and the Group VI element includes at least one of tungsten and molybdenum.

9. The process for preparing a catalyst for mild-hydrocracking of residual oil according to claim 8, wherein the catalyst support components further comprise silica or zeolite.

10. The process for preparing a catalyst for mild-hydrocracking of residual oil according to claim 8, wherein the catalyst support components further comprise zeolite and magnesium.

11. The process for preparing a catalyst for mild-hydrocracking of residual oil according to claim 8, wherein the catalyst support components further comprise zeolite and carbon.

* * * * *